July 12, 1955  G. F. KRTOUS  2,712,899
MECHANICAL COUNTER ACTUATING MECHANISM
Filed Oct. 31, 1952  2 Sheets-Sheet 1

INVENTOR.
GEORGE F. KRTOUS
BY Clarence E. Shredy
HIS ATTORNEY.

July 12, 1955  G. F. KRTOUS  2,712,899
MECHANICAL COUNTER ACTUATING MECHANISM
Filed Oct. 31, 1952  2 Sheets-Sheet 2

INVENTOR.
GEORGE F. KRTOUS
BY Clarence E. Threedy
HIS ATTORNEY.

United States Patent Office 2,712,899
Patented July 12, 1955

2,712,899

MECHANICAL COUNTER ACTUATING MECHANISM

George F. Krtous, Chicago, Ill., assignor to De Vry Corporation, Chicago, Ill., a corporation of Illinois Application October 31, 1952, Serial No. 317,947

2 Claims. (Cl. 235—91)

This invention relates to a mechanical counter actuating mechanism and has for its principal object the provision of an improved construction of this character especially adapted for recording the time of operation of a motion picture projecting machine, measured in terms of hours.

Heretofore, prior to the advent of this invention a serviceman had no way of determining how long a motion picture machine had been in operation since it was last serviced nor the length of time a part to be replaced had been in operation. By the provision of my invention, a serviceman can readily determine by reference to a register or counter the length of time of operation of the machine since it was last serviced or the length of time that a part to be replaced has been in operation. By such an arrangement, a serviceman is enabled to service a machine at regular periodical times.

Another and equally important object of my invention is to produce a simple, durable and inexpensive arrangement for timing in measurement of hours the length of time of operation of a motion picture projecting machine.

Another and equally important object is the provision in a motion picture projecting machine of a device of the character hereinafter described wherein the register will operate in the same direction whether the motion picture projecting machine is operated for film rewinding purposes or for film projecting purposes.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
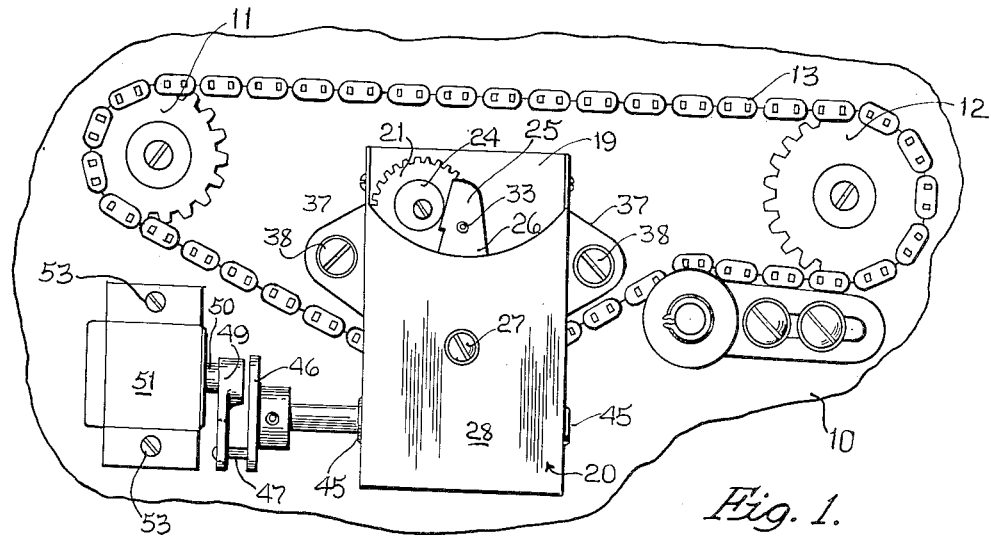
Fig. 1 is a fragmentary view of a motion picture projecting apparatus showing my invention associated therewith.

The several objects of my invention are accomplished by the preferred form of construction shown in the accompanying drawings. In such drawings I have shown a fragmentary part of a wall 10 of a conventional motion picture projecting machine. This wall usually has mounted thereon the take-up and rewind sprocket gears 11 and 12 connected together by means of a take-up chain drive sprocket 13 which operatively meshes with a gear 14 mounted on the shaft 15 which carries the film take-up sprocket (not shown).

Figures 2, 3:
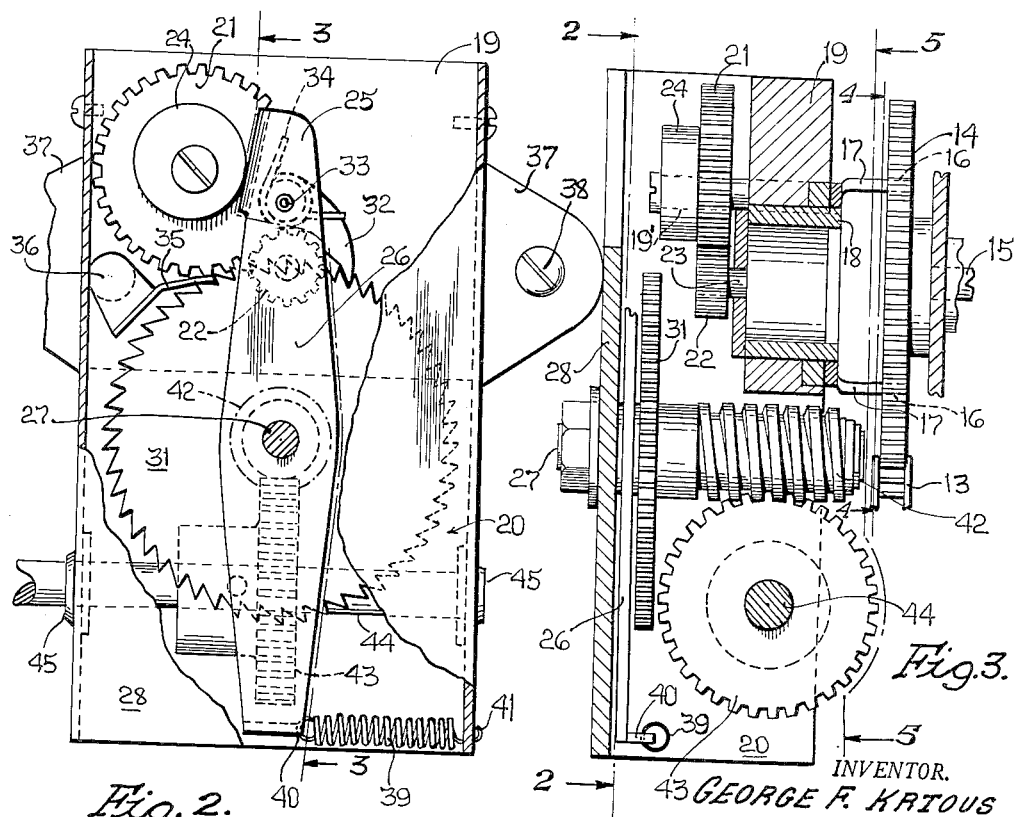
Fig. 2 is a sectional detail view taken substantially on line 2—2 of Fig. 3.
Fig. 3 is a sectional detail view taken substantially on line 3—3 of Fig. 2.
Figure 4:
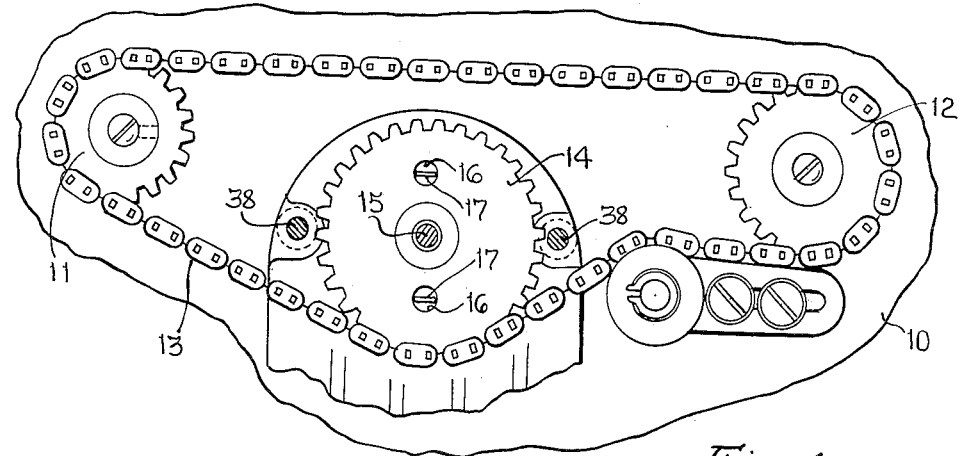
Fig. 4 is a sectional detail view taken substantially on line 4—4 of Fig. 3.

The sprocket gear 14 is provided with oppositely disposed openings 16 into which the ends of parallel arms 17 of a coupling 18 are adapted to project. This coupling is rotatably mounted in a wall 19 of an enclosure 20 and has operative engagement with a gear 21 through a pinion 22 (Fig. 3). This pinion 22 is fixedly mounted on a shaft 23 journalled in the wall 19. Carried by the shaft 19' is a cam 24, the periphery of which is adapted to engage the upper end 25 of a rocker arm 26. This rocker arm 26 is mounted upon a shaft 27 journalled in a wall 28 of the enclosure 20. On this shaft 27 is mounted a ratchet wheel 31, the teeth of which are adapted to be engaged by a pawl 32 pivotally carried as at 33 by the upper end portion 25 of the arm 26 and yieldably held in engagement with the leaf of a spring 34. Retraction of the ratchet wheel 31 is prevented by a spring dog 35 mounted on a wall of the enclosure 20 as at 36.

The enclosure 20 provides lateral ears 37 secured to the wall 10 by suitable securing elements 38.

Figure 5:
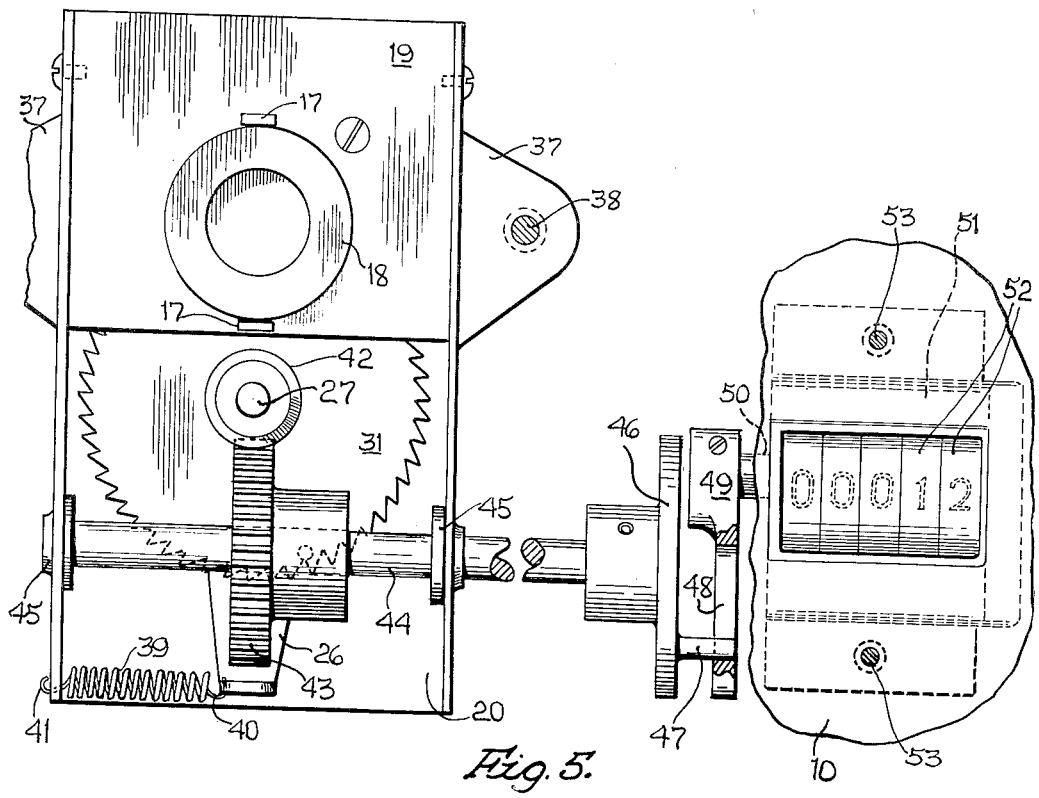
Fig. 5 is a sectional detail view taken substantially on line 5—5 of Fig. 3.

The cam engaging end of the rocker arm 26 is yieldably held in engagement with the cam by means of a spring 39 connected to the lower end of the rocker arm 26 as at 40 and to a wall of the enclosure 20 as at 41. On the shaft 27 is mounted a worm gear 42 (Fig. 3). This worm gear 42 meshes with a gear 43 mounted on a shaft 44 journaled in the opposite side walls of the enclosure as at 45 (Fig. 5). This shaft at its exterior end portion carries a flanged disc 46 from which extends a pin 47 operatively engaging in an elongated slot 48 of an arm 49. This arm 49 is secured to a shaft 50 of a register or counting device 51 comprising a number of hour-indicating wheels 52. This register is secured as at 53 to the wall 10. Such register may be of any improved construction now commercially in use and one in which the dials successively make one revolution per hour so that the timing of the length of operation of the motion picture projecting machine will be measured in terms of hours.

One of the unique features of my invention resides in the fact that regardless of the direction of rotation of the cam, the register will always operate in a clockwise direction and at no time will reverse itself by reason of the reverse direction of operation of the cam.

By such an arrangement, a serviceman may properly read and record the length of time a motion picture machine has been in operation. By such an arrangement, he is able to determine the proper time for servicing of the apparatus and the length of time a part to be replaced has been in operation. Such an arrangement incorporated in a motion picture projecting machine will result in considerable servicing cost savings and the like. It may be incorporated in any standard approved motion picture projecting machine.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A mechanism of the class described comprising a register having a shaft, a slotted arm on said shaft and extending laterally with respect thereto, a second shaft having its long axis in a plane offset with respect to the plane of the shaft, a disc on said second shaft and having a pin extending laterally therefrom in a plane offset with respect to the plane of the second shaft and engageable in the slot of the arm, a ratchet wheel, operative connection between the ratchet wheel and said second shaft, a rocker arm extending transversely of the ratchet wheel and having a pawl at one end thereof engageable with the ratchet wheel, a cam member engageable with said end portion of said rocker arm, spring means for yieldably holding said end portion of the rocker arm in engagement with said cam member, means for rotating said cam member to move said pawl into engagement with said ratchet wheel to impart step-by-step rotation to said ratchet wheel, and driving connection between said ratchet wheel and said second shaft.

2. A mechanism of the class described comprising a register having a shaft, a slotted arm on said shaft and extending laterally with respect thereto, a second shaft having its long axis in a plane offset with respect to the plane of the shaft, a disc on said second shaft and having a pin extending laterally therefrom in a plane offset with respect to the plane of the second shaft and engageable in the slot of the arm, a ratchet wheel, operative connection between the ratchet wheel and said second shaft, a rocker arm extending transversely of said ratchet wheel and having a pawl at one end thereof engageable with the ratchet wheel, a reversibly rotatable cam member engageable with said end portion of said rocker arm, spring means for yieldably holding said end portion of the rocker arm in engagement with said cam member, means for reversibly rotating said cam member to move said pawl into engagement with said ratchet wheel to impart step-by-step rotation to said ratchet wheel, and driving connection between said ratchet wheel and said second shaft.

References Cited in the file of this patent

UNITED STATES PATENTS

| | | |
|---|---|---|
| 324,003 | Brown | Aug. 11, 1885 |
| 987,273 | Wardwell | Mar. 21, 1911 |
| 1,409,851 | Harper | Mar. 14, 1922 |
| 1,689,802 | Proctor | Oct. 30, 1928 |
| 1,783,562 | Forbstern | Dec. 2, 1930 |